(12) United States Patent
Wang et al.

(10) Patent No.: US 10,446,840 B2
(45) Date of Patent: Oct. 15, 2019

(54) RECHARGEABLE ZINC-ION BATTERIES HAVING FLEXIBLE SHAPE MEMORY

(71) Applicant: City University of Hong Kong, Kowloon (HK)

(72) Inventors: Zifeng Wang, Kowloon (HK); Chunyi Zhi, Shatin (HK)

(73) Assignee: City University of Hong Kong, Kowloon (HK)

( * ) Notice: Subject to any disclaimer, the term of this patent is extended or adjusted under 35 U.S.C. 154(b) by 145 days.

(21) Appl. No.: 15/805,817

(22) Filed: Nov. 7, 2017

(65) Prior Publication Data

US 2019/0140270 A1 May 9, 2019

(51) Int. Cl.
*H01M 4/42* (2006.01)
*H01M 10/36* (2010.01)
(Continued)

(52) U.S. Cl.
CPC ........... *H01M 4/42* (2013.01); *H01M 4/0404* (2013.01); *H01M 4/045* (2013.01); *H01M 4/0438* (2013.01); *H01M 4/38* (2013.01); *H01M 4/624* (2013.01); *H01M 4/626* (2013.01); *H01M 4/70* (2013.01); *H01M 4/765* (2013.01);
(Continued)

(58) Field of Classification Search
CPC ...... H01M 4/42; H01M 4/0438; H01M 10/36; H01M 4/624; H01M 4/38; H01M 10/04; H01M 2004/027; H01M 2300/0002; H01M 4/70; H01M 4/75; H01M 4/78; H01M 4/765

See application file for complete search history.

(56) References Cited

U.S. PATENT DOCUMENTS 4,306,061 A 12/1981 Majewicz
8,663,844 B2 3/2014 Kang et al.
(Continued)

OTHER PUBLICATIONS

Kim, D.-H. et al. "Silicon Electronics on Silk as a Path to Bioresorbable, Implantable Devices," Appl. Phys. Lett., 95, 133701, 2009, 3 pages.
(Continued)

*Primary Examiner* — Michael L Dignan
(74) *Attorney, Agent, or Firm* — Norton Rose Fulbright US LLP (57) ABSTRACT

Systems and methods which provide flexible zinc ion (Zn-ion) battery configurations with shape memory are described. For example, embodiments of flexible shape memory yarn batteries (SMYBs) may be fabricated using shape memory material wire, filament, and/or fiber and flexible conductive material yarn as flexible substrate materials. In accordance with some embodiments, Nickel-Titanium-based alloy wire may be coated with a zinc material to provide a flexible anode electrode for a SMYB. Additionally or alternatively, flexible stainless steel (SS) yarn may be coated with a manganese dioxide ($MnO_2$) material to provide a flexible cathode electrode for a SMYB of embodiments. An aqueous electrolyte may be combined with the flexible cathode and anode electrodes to provide a SMYB in accordance with the concepts herein. The aqueous electrolyte may, for example, comprise a polymer gel electrolyte (e.g., gelatin-borax polymer gel electrolyte).

27 Claims, 9 Drawing Sheets

(51) Int. Cl.
| | |
|---|---|
| H01M 4/38 | (2006.01) |
| H01M 4/62 | (2006.01) |
| H01M 10/04 | (2006.01) |
| H01M 4/04 | (2006.01) |
| H01M 4/70 | (2006.01) |
| H01M 4/76 | (2006.01) |
| H01M 10/054 | (2010.01) |
| H01M 10/0565 | (2010.01) |
| H01M 10/0568 | (2010.01) |
| H01M 4/02 | (2006.01) |
| H01M 2/02 | (2006.01) |

(52) U.S. Cl.
CPC ......... *H01M 10/04* (2013.01); *H01M 10/054* (2013.01); *H01M 10/0565* (2013.01); *H01M 10/0568* (2013.01); *H01M 10/36* (2013.01); *H01M 2002/0205* (2013.01); *H01M 2004/027* (2013.01); *H01M 2300/0002* (2013.01)

(56) References Cited

U.S. PATENT DOCUMENTS

| | | | |
|---|---|---|---|
| 8,940,434 B2 | 1/2015 | Khasanov et al. | |
| 2003/0068559 A1* | 4/2003 | Armstrong | B32B 5/02 |
| | | | 429/234 |
| 2005/0153208 A1* | 7/2005 | Konishiike | H01M 4/134 |
| | | | 429/245 |
| 2013/0130112 A1* | 5/2013 | Chung | C23C 24/08 |
| | | | 429/223 |
| 2014/0050990 A1 | 2/2014 | Yuan et al. | |
| 2014/0205909 A1 | 7/2014 | Yonehara et al. | |
| 2016/0301096 A1 | 10/2016 | Zhamu et al. | |
| 2017/0222272 A1 | 8/2017 | Takami et al. | |

OTHER PUBLICATIONS

Sun, H. et al. "Large-Area Supercapacitor Textiles with Novel Hierarchical Conducting Structures," Adv. Mater., vol. 28, No. 38, pp. 8431-8438, Oct. 2016, 8 pages.
Huang, Y. et al. "Robust Reduced Graphene Oxide Paper Fabricated With a Household Non-Stick Frying Pan: A Large-Area Freestanding Flexible Substrate for Supercapacitors," RSC Adv., vol. 5, No. 43, pp. 33981-33989, Mar. 2015, 9 pages.
Lu, X. et al. "Flexible Solid-State Supercapacitors: Design, Fabrication and Applications," Energy Environ. Sci., vol. 7, pp. 2160-2181, 2014, 22 pages.
Yu, D. et al. "Transforming Pristine Carbon Fiber Tows into High Performance Solid-State Fiber Supercapacitors," Adv. Mater., vol. 27, pp. 4895-4901, 2015, 7 pages.
Zhou, G. et al. "Progress in Flexible Lithium Batteries and Future Prospects," Energ. Environ. Sci., vol. 7, pp. 1307-1338, 2014, 32 pages.
Huang, Y. et al. "A Modularization Approach for Linear-Shaped Functional Supercapacitors," J. Mater. Chem. A, vol. 4, No. 12, pp. 4580-4586, Feb. 2016, 7 pages.
Sun, H. et al. "Energy Harvesting and Storage in 1D Devices," Nat. Rev. Mater., vol. 2, 17023, 2017, 12 pages.
Wang, X. et al. "Flexible Fiber Energy Storage and Integrated Devices: Recent Progress and Perspectives," Mater. Today, vol. 18, pp. 265-272, Jun. 2015, 8 pages.
Kwon, Y. H. et al. "Cable-Type Flexible Lithium Ion Battery Based on Hollow Multi-Helix Electrodes," Adv. Mater., vol. 24, pp. 5192-5197, 2012, 6 pages.
Hoshide, T. et al. "Flexible Lithium-Ion Fiber Battery by the Regular Stacking of Two-Dimensional Titanium Oxide Nanosheets Hybridized with Reduced Graphene Oxide," Nano Lett., vol. 17, No. 6, pp. 3543-3549, 2017, 7 pages.
Fang, X. et al. "A Cable-Shaped Lithium Sulfur Battery," Adv. Mater., vol. 28 (3), pp. 491-496, 2016, 6 pages.
Kou, L. et al. "Coaxial Wet-Spun Yarn Supercapacitors for High-Energy Density and Safe Wearable Electronics," Nat. Commun., vol. 5, 3754, 2014, 10 pages.
Choi, C. et al. "Improvement of System Capacitance via Weavable Superelastic Biscrolled Yarn Supercapacitors," Nat. Commun., vol. 7, 13811, 2016, 8 pages.
Yu, D. et al. "Scalable Synthesis of Hierarchically Structured Carbon Nanotube-Graphene Fibres for Capacitive Energy Storage," Nat. Nanotechnol., vol. 9, pp. 555-562, 2014, 9 pages.
Shen, Y. W. et al. "The Mechanism of Capacity Fade of Rechargeable Alkaline Manganese Dioxide Zinc Cells," J. Power Sources, vol. 87, pp. 162-166, 2000, 5 pages.
Yu, X. et al. "Flexible Fiber-Type Zinc-Carbon Battery Based on Carbon Fiber Electrodes," Nano Energy, vol. 2, No. 6, pp. 1242-1248, 2013, 7 pages.
Gaikwad, A. M. et al. "Highly Flexible, Printed Alkaline Batteries Based on Mesh-Embedded Electrodes," Adv. Mater., vol. 23, pp. 3251-3255, 2011, 5 pages.
Wang, Z. et al. "Fabrication of High-Performance Flexible Alkaline Batteries by Implementing Multiwalled Carbon Nanotubes and Copolymer Separator," Adv. Mater., vol. 26, pp. 970-976, 2014, 7 pages.
Xu, C. et al. "Energetic Zinc Ion Chemistry: the Rechargeable Zinc Ion Battery," Angew. Chem. Int. Ed., vol. 51, pp. 933-935, 2012, 3 pages.
Pan, H. et al. "Reversible Aqueous Zinc/Manganese Oxide Energy Storage From Conversion Reactions," Nat. Energy, vol. 1, 16039, 2016, 7 pages.
Lee, B. et al. "Electrochemically-Induced Reversible Transition from the Tunneled to Layered Polymorphs of Manganese Dioxide," Sci. Rep., vol. 4, pp. 6066-6074, 2014, 8 pages.
Alfaruqi, M. H. et al. "A Layered $\delta$-$MnO_2$ Nanoflake Cathode with High Zinc-Storage Capacities for Eco-Friendly Battery Applications," Electrochem. Commun., vol. 60, pp. 121-125, 2015, 5 pages.
Alfaruqi, M. H. et al. "Electrochemically Induced Structural Transformation in a $\gamma$-MnO Cathode of a High Capacity Zinc-Ion Battery System," Chem. Mater., vol. 27, pp. 3609-3620, 2015, 12 pages.
Huang, Y. et al. "A Polyacrylamide Hydrogel Electrolyte Enabled Intrinsically 1000% Stretchable and 50% Compressible Supercapacitor," Angew. Chem. Int. Ed., vol. 129, 2017, 7 pages.
Choudhury, N. A. et al. "Hydrogel-Polymer Electrolytes for Electrochemical Capacitors: An Overview," Energy Environ. Sci., vol. 2 (1), pp. 55-67, 2009, 13 pages.
Yang, F. et al. "Synthesis, Characterization, and Applied Properties of Carboxymethyl Cellulose and Polyacrylamide Graft Copolymer," Carbohyd. Polym., vol. 78, pp. 95-99, 2009, 5 pages.
Hu, X. et al. "Synthesis and Characterization of a Novel Hydrogel: Salecan/Polyacrylamide Semi-IPN Hydrogel with a Desirable Pore Structure," J. Mater. Chem. B, vol. 2, pp. 3646-3658, 2014, 13 pages.
Ghosh, P. et al. "Studies on Stable Aqueous Polyaniline Prepared with the Use of Polyacrylamide as the Water Soluble Support Polymer," Eur. Polym. J., vol. 35, pp. 803-813, 1999, 11 pages.
Biswal, D. R. et al. "Flocculation Studies Based on Water-Soluble Polymers of Grafted Carboxymethyl Cellulose and Polyacrylamide," J. Appl. Polym. Sci., vol. 102, pp. 1000-1007, 2006, 8 pages.
Biswal, D. R. et al. "Characterisation of Carboxymethyl Cellulose and Polyacrylamide Graft Copolymer," Carbohyd. Polym., vol. 57, pp. 379-387, 2004, 9 pages.
Liu, J. et al. "A Flexible Quasi-Solid-State Nickel-Zinc Battery with High Energy and Power Densities Based on 3D Electrode Design," Adv. Mater., vol. 28, 8732-8739, 2016, 8 pages.
Pech, D. et al. "Ultrahigh-Power Micrometre-Sized Supercapacitors Based on Onion-Like Carbon," Nat. Nanotechnol., vol. 5, pp. 651-654, 2010, 4 pages.
Yang, Y. et al. "Waterproof, Ultrahigh Areal-Capacitance, Wearable Supercapacitor Fabrics," Adv. Mater., vol. 29, 1606679, 2017, 9 pages.
Deng, J. et al. "A Shape-Memory Supercapacitor Fiber," Angew. Chem. Int. Ed., vol. 54, pp. 15419-15423, 2015, 5 pages.
You, J. et al. "A Polymer Tandem Solar Cell with 10.6% Power Conversion Efficiency," Nat. Commun., vol. 4, 1446, 2013, 10 pages.

(56) References Cited

OTHER PUBLICATIONS

Liu, W. et al. "Solar-Induced Direct Biomass-to-Electricity Hybrid Fuel Cell Using Polyoxometalates as Photocatalyst and Charge Carrier," Nat. Commun., vol. 5, 3208, 2014, 8 pages.
Snyder, G. J. et al. "Complex Thermoelectric Materials," Nat. Mater., vol. 7, pp. 105-114, 2008, 10 pages.
Sun, Y. et al. "Promises and Challenges of Nanomaterials for Lithium-Based Rechargeable Batteries," Nature Energy, vol. 1, 16071, 2016, 12 pages.
Ji, L. et al."Recent Developments in Nanostructured Anode Materials for Rechargeable Lithium-Ion Batteries," Energy Environ. Sci., vol. 4, pp. 2682-2699, 2011, 18 pages.
Kim, S.-W. et al. "Electrode Materials for Rechargeable Sodium-Ion Batteries: Potential Alternatives to Current Lithium-Ion Batteries," Adv. Energy Mater., vol. 2, pp. 710-721, 2012, 12 pages.
Goodenough, J. B. et al "The Li-Ion Rechargeable Battery: A Perspective," J. Am. Chem. Soc., vol. 135, pp. 1167-1176, 2013, 10 pages.
Wang, X. et al "An Aqueous Rechargeable $Zn//Co_3O_4$ Battery with High Energy Density and Good Cycling Behavior," Adv. Mater., vol. 28, pp. 4904-4911, 2016, 8 pages.
Liu, B. et al. "Hierarchical Three-Dimensional $ZnCo_2O_4$ Nanowire Arrays/Carbon Cloth Anodes for a Novel Class of High-Performance Flexible Lithium-Ion Batteries," Nano Lett., vol. 12, pp. 3005-3011, 2012, 7 pages.
Koo, M. et al "Bendable Inorganic Thin-Film Battery for Fully Flexible Electronic Systems," Nano Lett., vol. 12, pp. 4810-4816, 2012, 7 pages.
Wang, C. et al. "Functionalized Polythiophene-Coated Textile: A New Anode Material for a Flexible Battery," J. Power Sources, vol. 156, pp. 610-614, 2006, 5 pages.
Liu, W. et al. "3D Porous Sponge-Inspired Electrode for Stretchable Lithium-Ion Batteries," Adv. Mater., vol. 28, pp. 3578-3583, 2016, 6 pages.
Huang, Y. et al. "A Self-Healable and Highly Stretchable Supercapacitor Based on a Dual Crosslinked Polyelectrolyte," Nat. Comm., vol. 6, 10310, 2015, 8 pages.
Frenzel, J. et al. "Influence of Ni on Martensitic Phase Transformations in NiTi Shape Memory Alloys," Acta Materialia, vol. 58, pp. 3444-3458, 2010, 15 pages.
Nespoli, A. et al. "The High Potential of Shape Memory Alloys in Developing Miniature Mechanical Devices: A Review on Shape Memory Alloy Mini-Actuators," Sensors and Actuators A: Physical, vol. 158, pp. 149-160, 2010, 12 pages.
Jung, H. et al. "Nanosize Si Anode Embedded in Super-Elastic Nitinol (Ni—Ti) Shape Memory Alloy Matrix for Li Rechargeable Batteries," J. Mater. Chem., vol. 21, pp. 11213-11216, 2011, 4 pages.
Huang, Y. et al. "A Shape Memory Supercapacitor and its Application in Smart Energy Storage Textiles," J. Mater. Chem. A, vol. 4, pp. 1290-1297, 2016, 8 pages.
Li, Y.-Q. et al. "Remarkable Improvements in Volumetric Energy and Power of 3D $MnO_2$ Microsupercapacitors by Tuning Crystallographic Structures," Adv. Funct. Mater., vol. 26, pp. 1830-1839, 2016, 10 pages.
Zhu, M. et al. "Highly Flexible, Freestanding Supercapacitor Electrode with Enhanced Performance Obtained by Hybridizing Polypyrrole Chains with MXene," Adv.Energy Mater., vol. 6, 1600969, 2016, 9 pages.
Huang, Y. et al. "Extremely Stable Polypyrrole Achieved via Molecular Ordering for Highly Flexible Supercapacitors," ACS Appl. Mater. And Interfaces, vol. 8, pp. 2435-2440, 2016, 6 pages.
Huang, Y. et al. "Enhanced Tolerance to Stretch-Induced Performance Degradation of Stretchable $MnO_2$-Based Supercapacitors," ACS Appl. Mater. And Interfaces, vol. 7, pp. 2569-2574, 2015, 6 pages.
Li, M. et al. "Polypyrrole Nanofiber Arrays Synthesized by a Biphasic Electrochemical Strategy," J. Mater. Chem., vol. 18, pp. 2276-2280, 2008, 5 pages.

Xie, Y. et al. "Electrochemical Capacitance of a Carbon Quantum Dots-Polypyrrole/Titania Nanotube Hybrid," RSC Adv., vol. 5, pp. 89689-89697, 2015, 9 pages.
Kuang, P.-Y. et al. "Anion-assisted One-Pot Synthesis of 1D Magnetic α- and β-$MnO_2$ Nanostructures for Recyclable Water Treatment Application," New J. Chem., vol. 39, pp. 2497-2505, 2015, 9 pages.
Cai, G. et al. "Extremely Stretchable Strain Sensors Based on Conductive Self-Healing Dynamic Cross-Links Hydrogels for Human-Motion Detection," Adv. Sci., 4, 1600190, 2017, 7 pages.
Spoljaric, S. "Stable, Self-healing Hydrogels from Nanofibrillated Cellulose, Poly(Vinyl Alcohol) and Borax via Reversible Crosslinking," Eur. Polym. J., vol. 56, pp. 105-117, 2014, 41 pages.
Wang, H. et al. "Alternative Multifunctional Cyclic Organosilicon as an Efficient Electrolyte Additive for High Performance Lithium-Ion Batteries." Electrochim. Acta, vol. 254, pp. 112-122, (2017), 11 pages.
Zhang, S.S. "A Review on Electrolyte Additives for Lithium-Ion Batteries." J. Power Sources, vol. 162, pp. 1379-1394, (2006), 16 pages.
Arthur, T. S. et al. "Three-Dimensional Electrodes and Battery Architectures." MRS Bull. vol. 36, pp. 523-531, (2011), 9 pages.
Liu, L. et al. "Advances on Microsized On-Chip Lithium-Ion Batteries." Small, vol. 13, 1701847, (2017), 12 pages.
Zhu, M. S. et al. "Capacitance Enhancement in a Semiconductor Nanostructure-Based Supercapacitor by Solar Light and a Self-Powered Supercapacitor Photodetector System." Adv. Funct. Mater., vol. 26, pp. 4481-4490, (2016), 10 pages.
Zhu, M. S. et al. "An Electrochromic Supercapacitor and its Hybrid Derivatives: Quantifiably Determining Their Electrical Energy Storage by an Optical Measurement." J. Mater. Chem. A, vol. 3, pp. 21321-21327, (2015), 7 pages.
Zhang, P. P. et al. "Stimulus-Responsive Micro-Supercapacitors with Ultrahigh Energy Density and Reversible Electrochromic Window." Adv. Mater., vol. 29, 1604491 (2017), 7 pages.
Manthiram, A. "An Outlook on Lithium Ion Battery Technology." ACS Central Sci., vol. 3, pp. 1063-1069, (2017), 7 pages.
Kim, H. et al. "Aqueous Rechargeable Li and Na Ion Batteries." Chem. Rev., vol. 114, pp. 11788-11827, (2014), 40 pages.
Sun, W. et al. "$Zn/MnO_2$ Battery Chemistry With $H^+$ and $Zn^{2+}$ Coinsertion." J. Am. Chem. Soc., vol. 139, pp. 9775-9778, (2017), 4 pages.
Zhang, N. et al. "Rechargeable Aqueous Zinc-Manganese Dioxide Batteries with High Energy and Power Densities." Nat. Commun., vol. 8, 405, (2017), 9 pages.
Zhang, N. et al. "Cation-Deficient Spinel $ZnMn_2O_4$ Cathode in $Zn(CF3SO3)2$ Electrolyte for Rechargeable Aqueous Zn-Ion Battery." J. Am. Chem. Soc., vol. 138, pp. 12894-12901, (2016), 8 pages.
Kundu, D. et al. "A High-Capacity and Long-Life Aqueous Rechargeable Zinc Battery Using a Metal Oxide Intercalation Cathode." Nat. Energy, vol. 1, 16119 (2016), 7 pages.
Suo, L. M. et al. ""Water-in-Salt" Electrolyte Makes Aqueous Sodium-Ion Battery Safe, Green, and Long-Lasting." Adv. Energy Mater., vol. 7, 1701189, (2017), 10 pages.
Yang, C. Y. et al. "Flexible Aqueous Li-ion Battery with High Energy and Power Densities." Adv. Mater., vol. 29, 1701972 (2017), 8 pages.
Yamada, Y. et al. "Hydrate-Melt Electrolytes for High-Energy-Density Aqueous Batteries." Nat. Energy, vol. 1, 16129, (2016), 9 pages.
Suo, L. M. et al. ""Water-in-Salt" Electrolyte Enables High-Voltage Aqueous Lithium-Ion Chemistries." Science, vol. 350, pp. 938-943, (2015), 6 pages.
Boles, M. A. et al. "Self-Assembly of Colloidal Nanocrystals: From Intricate Structures to Functional Materials." Chem. Rev., vol. 116, pp. 11220-11289 (2016), 70 pages.
Talapin, D. V. et al. "Prospects of Colloidal Nanocrystals for Electronic and Optoelectronic Applications." Chem. Rev., vol. 110, pp. 389-458, (2010), 70 pages.
Gaponik, N. et al. "Thiol-capping of CdTe Nanocrystals: An Alternative to Organometallic Synthetic Routes." J. Phys. Chem. B, vol. 106, pp. 7177-7185, (2002), 9 pages.

(56) References Cited

OTHER PUBLICATIONS

Rogach, A. L. et al. "Aqueous Synthesis of Thiol-Capped CdTe Nanocrystals: State-of-the-Art." J. Phys. Chem. C, vol. 111, 14628-14637, (2007), 10 pages.

Kim, J. Y. et al. "25th Anniversary Article: Colloidal Quantum Dot Materials and Devices: A Quarter-Century of Advances." Adv. Mater., vol. 25, pp. 4986-5010 (2013), 25 pages.

Palui, G. et al. "Strategies for Interfacing Inorganic Nanocrystals With Biological Systems Based on Polymer-Coating." Chem. Soc. Rev., vol. 44, pp. 193-227, (2015), 35 pages.

Tang, Q. W. et al. Effect of Surface Manganese Valence of Manganese Oxides on the Activity of the Oxygen Reduction Reaction in Alkaline Media. ACS Catal., vol. 4, pp. 457-463 (2014), 7 pages.

Song, Y. et al. "Pushing the Cycling Stability Limit of Polypyrrole for Supercapacitors." Adv. Funct. Mater., vol. 25, pp. 4626-4632, (2015), 7 pages.

Yuan, X. X. et al. "Improved Performance of Proton Exchange Membrane Fuel Cells with p-Toluenesulfonic Acid-Doped Co-PPy/C as Cathode Electrocatalyst." J. Am. Chem. Soc., vol. 132, pp. 1754-1755, (2010), 2 pages.

Adam, M. et al. "Implementation of High-Quality Warm-White Light-Emitting Diodes by a Model-Experimental Feedback Approach Using Quantum Dot-Salt Mixed Crystals." ACS Appl. Mater. Interfaces, vol. 7, pp. 23364-23371, (2015), 8 pages.

Adam, M. et al. "Colloidal Nanocrystals Embedded in Macrocrystals: Methods and Applications." J. Phys. Chem. Lett., pp. 4117-4123, (2016), 7 pages.

Otto, T. et al. "Colloidal Nanocrystals Embedded in Macrocrystals: Robustness, Photostability, and Color Purity." Nano Lett., vol. 12, pp. 5348-5354, (2012), 7 pages.

Zhang, F. et al. "Brightly Luminescent and Color-Tunable Colloidal $CH_3NH_3PbX_3$ (X=Br, I, Cl) Quantum Dots: Potential Alternatives for Display Technology." ACS Nano, vol. 9, pp. 4533-4542, (2015), 10 pages.

Wang, X. Y. et al. "Surface-Related Emission in Highly Luminescent CdSe Quantum Dots." Nano Lett., vol. 3, pp. 1103-1106, (2003), 4 pages.

Lu, Y. Y. et al. "Stable Cycling of Lithium Metal Batteries Using High Transference Number Electrolytes." Adv. Energy Mater., vol. 5, 1402073 (2015), 7 pages.

Liu, W. et al. "Enhancing Ionic Conductivity in Composite Polymer Electrolytes with Well-Aligned Ceramic Nanowires." Nat. Energy, vol. 2, 17035 (2017), 7 pages.

Hayes, A. C. et al. "Raman Spectroscopic Study of Aqueous $(NH_4)_2SO4$ and $ZnSO_4$ Solutions." J. Solution Chem., vol. 13, pp. 61-75, (1984), 15 pages.

Liu, W. et al. "Improved Lithium Ionic Conductivity in Composite Polymer Electrolytes with Oxide-Ion Conducting Nanowires." ACS Nano, vol. 10, pp. 11407-11413, (2016), 7 pages.

Wu, Z.-S. et al. "Graphene-Based In-Plane Micro-Supercapacitors with High Power and Energy Densities." Nat. Commun., vol. 4, 2487 (2013), 8 pages.

El-Kady, M. F. et al. "Scalable Fabrication of High-Power Graphene Micro-Supercapacitors for Flexible and On-Chip Energy Storage." Nat. Commun., vol. 4, 1475 (2013), 9 pages.

Li, L. et al. "High-Performance Pseudocapacitive Microsupercapacitors from Laser-Induced Graphene." Adv. Mater., vol. 28, pp. 838-845, (2016), 8 pages.

Pikul, J. H. et al. "High-Power Lithium Ion Microbatteries From Interdigitated Three-Dimensional Bicontinuous Nanoporous Electrodes." Nat. Commun., vol. 4, 1732 (2013), 5 pages.

Sun, K. et al. "3D Printing of Interdigitated Li-Ion Microbattery Architectures." Adv. Mater., vol. 25, 4539-4543, (2013), 5 pages.

Ning, H. L. et al. "Holographic Patterning of High-Performance On-Chip 3D Lithium-Ion Microbatteries." P. Natl. Acad. Sci. USA, vol. 112, pp. 6573-6578, (2015), 6 pages.

Yu, W. W. et al. "Experimental Determination of the Extinction Coefficient of CdTe, CdSe, and CdS Nanocrystals." Chem. Mater., vol. 15, pp. 2854-2860, (2003), 7 pages.

Song, Y. et al. "Electrochemical Anchoring of Dual Doping Polypyrrole on Graphene Sheets Partially Exfoliated From Graphite Foil for High-Performance Supercapacitor Electrode." J. Power Sources, vol. 249, pp. 48-58, (2014), 11 pages.

\* cited by examiner

RECHARGEABLE ZINC-ION BATTERIES HAVING FLEXIBLE SHAPE MEMORY

CROSS-REFERENCE TO RELATED APPLICATION

The present application is related to co-pending U.S. patent application Ser. No. 15/805,779, filed Nov. 7, 2017, and entitled "RECHARGEABLE POLYACRYLAMIDE BASED POLYMER ELECTROLYTE ZINC ION BATTERIES" filed concurrently herewith, the disclosure of which is hereby incorporated herein by reference.

TECHNICAL FIELD

The present invention relates generally to energy-storage devices and, more particularly, to flexible zinc ion battery configurations with shape memory.

BACKGROUND OF THE INVENTION

Renewable and clean energy in various forms, such as solar energy, wind energy, and electrochemical energy, is becoming increasingly important due to the pressure from both the environment and the human society. To this end, different types of energy storage and conversion devices, such as solar cells, fuel cells, thermoelectric generators, electrochemical supercapacitors, and rechargeable batteries, have been proposed and fabricated for facilitating energy utilization in a more sustainable and efficient way.

Compared with other types of renewable energy storage or conversion devices, electrochemical energy storage devices provide more reliable and stable energy output as well as ease of fabrication facilitating their large scale production. As a result, rechargeable batteries among all the electrochemical energy storage devices have been intensively investigated in the recent years. Accordingly, many different types of battery systems have been proposed, such as lithium-ion (Li-ion) batteries and sodium-ion (Na-ion) batteries which offer higher energy density as compared with supercapacitors. Among the various battery systems proposed, zinc-ion (Zn-ion) batteries, produced primarily from zinc (Zn) and manganese dioxide ($MnO_2$), have received increased attention due to their safe nature resulting from the aqueous electrolyte and the stable Zn metal anode material utilized.

The demand for developing flexible and wearable electronics, however, is stimulating the desire for portable energy storage devices with high mechanical flexibility and high energy storage capabilities. Such flexible and high energy storage devices drive new requirements on the choice of materials for the development of suitable rechargeable batteries, such as for use in next-generation flexible and wearable electronics.

One approach to the fabrication of a flexible battery is to deposit electrochemical active materials onto a flexible substrate, such as carbon cloth, polymeric elastomers, or textiles, see X. Wang, F. Wang, L. Wang, M. Li, Y. Wang, B. Chen, Y. Zhu, L. Fu, L. Zha, and L. Zhang, *Advanced materials,* 2016, 28, 4904-4911, B. Liu, J. Zhang, X. Wang, G. Chen, D. Chen, C. Zhou, and G. Shen, *nano letters,* 2012, 12, 3005-3011, M. Koo, K. I. Park, S. H. Lee, M. Suh, D. Y. Jeon, J. W. Choi, K. Kang, and K. J. Lee, *Nano letters,* 2012, 12, 4810-4816, C. Wang, A. Ballantyne, S. Hall, C. Too, D. Officer, and G. Wallace, *Journal of power sources,* 2006, 156, 610-614, and W. Liu, Z. Chen, G. Zhou, Y. Sun, H. R. Lee, C. Liu, H. Yao, Z. Bao, and Y. Cui, *Advanced materials,* 2016, 28, 3578-3583, the disclosures of which are incorporated herein by reference. Implementation of such an approach generally renders the battery with mechanical flexibility under external forces, as compared with conventional batteries that comprise more rigid metallic current collectors, such as copper and stainless steel. However, although such batteries exhibit flexibility under external forces, they are relatively fragile and show negligible recoverability of performance once serious mechanical deformation of the battery has occurred.

BRIEF SUMMARY OF THE INVENTION

The present invention is directed to systems and methods which provide flexible zinc ion (Zn-ion) battery configurations with shape memory. For example, smart yarn-based flexible and rechargeable Zn-ion batteries with shape memory function, which enables the batteries to restore the shape and energy storage capability against mechanical deformation (e.g., by temperature triggered shape memory effect), are provided according to embodiments of the invention. Such yarn-based flexible rechargeable Zn-ion batteries with shape memory are referred to herein as flexible shape memory yarn batteries (SMYBs).

Embodiments of a SMYB may be fabricated using shape memory material wire and flexible conductive material yarn as flexible substrate materials. For example, Nickel-Titanium-based alloy wire may be coated (e.g., using an electrodeposition process) with a zinc material (e.g., zinc, zinc alloy, zinc composites, etc.) to provide a flexible anode electrode for a SMYB of embodiments. Additionally or alternatively, flexible stainless steel (SS) yarn may, for example, be coated (e.g., using an electrodeposition process) with a manganese dioxide ($MnO_2$) material (e.g., $MnO_2$ nanocrystallines)) to provide a flexible cathode electrode for a SMYB of embodiments. An aqueous electrolyte may be combined with the flexible cathode and anode electrodes to provide a SMYB in accordance with the concepts herein. The aqueous electrolyte may, for example, comprise a polymer gel electrolyte (e.g., gelatin-borax polymer gel electrolyte).

Zn-ion batteries provided in accordance with concepts herein exhibit high mechanical flexibility as well as excellent recoverability against external mechanical deformation for multiple times while maintaining their electrochemical performance. Moreover, embodiments of a SMYB are configured to restore their shape and energy storage capability against mechanical deformation.

Embodiments of a Zn-ion battery herein may be configured to provide enhanced cyclic life and/or stability. For example, a flexible cathode of embodiments of the invention may comprise a coating provided for improved stability of the cathode structure and/or improved energy storage capability of the Zn-ion battery. In accordance with some embodiments, polypyrrole (PPy) coating may be provided on a stainless steel yarn cathode electrode structure previously coated with $MnO_2$ nanocrystallines, whereby enhanced cyclic life may be provided due to the polypyrrole coating on the $MnO_2$ nanocrystallines.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Flexible rechargeable energy storage devices may provide a suitable source of energy in a number of emerging areas. For example, flexible and wearable renewable energy storage devices, such as supercapacitors and rechargeable batteries, may be desirable for use with respect to flexible and wearable electronics currently under development. However, such uses leave their energy storage devices susceptible to mechanical deformation, leading to inevitable damage and degradation of performance of the energy storage device. Accordingly, embodiments of the present invention provide a flexible zinc ion (Zn-ion) battery with shape memory, such as is well suited for use with respect to flexible and wearable electronics.

Figure 1A:
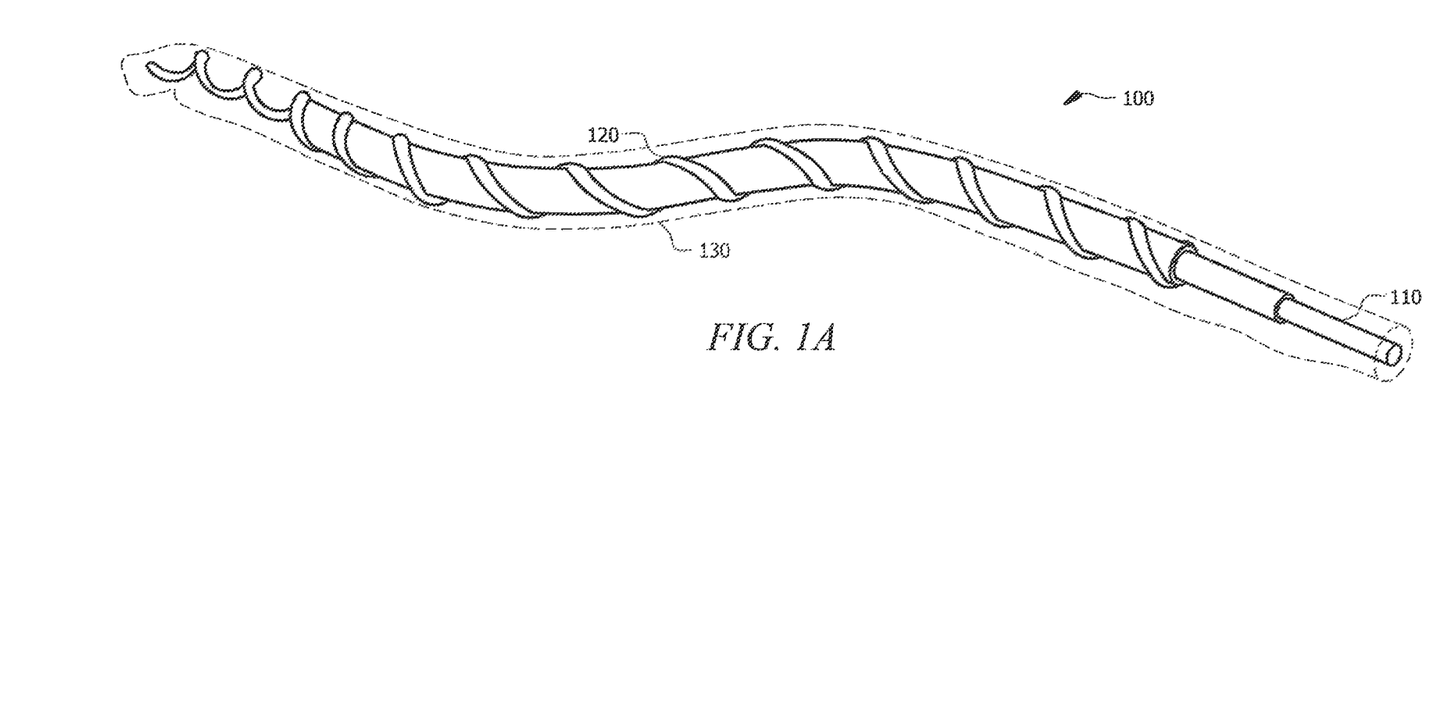
FIG. 1A shows a flexible Zn-ion battery implementation according to embodiments of the present invention.

FIG. 1A shows a flexible Zn-ion battery implementation according to embodiments of the present invention. In particular, flexible Zn-ion battery 100 of the embodiment illustrated in FIG. 1A comprises flexible anode 110, flexible cathode 120, and electrolyte 130 provided in a cooperative relationship operative to function as a flexible rechargeable energy storage device. Due to the flexibility of both of the substrate materials, the Zn-ion battery of embodiments exhibits good flexibility under external force.

Flexible Zn-ion battery 100 shown in FIG. 1 comprises flexible cathode 120 wound around flexible anode 110 to form a flexible rechargeable Zn-ion battery having a helical structure. Electrolyte 130 preferably encapsulates flexible anode 110 and flexible cathode 120 so as to serve both as an electrolyte for the flexible rechargeable Zn-ion battery and as a separator for the electrodes (flexible anode 110 and flexible cathode 120) to avoid shorting between the electrodes as well as providing mechanical strength for the flexible device.

Electrolyte 130 of embodiments of flexible Zn-ion battery 100 comprises an aqueous electrolyte, such as a polymer gel electrolyte (e.g., gelatin-borax polymer gel electrolyte). Embodiments of electrolyte 130 may be gelatin based in light of gelatin (e.g., derived from the animal bones and skins, etc.) being an environmentally friendly biopolymer and the abundant side-chain groups (e.g., amino and carboxyl groups) endowing the biopolymer with compatibility to various inorganic ions. However, the poor water retention capability and relatively weak mechanical strength of gelatin hinders its application as a solid-state or gel polymer electrolyte for rechargeable batteries. Borax, however, may be used as a cross-linker for water soluble polymers, such as polyvinyl alcohol (PVA) due to its potential of hydrolysis in aqueous solution, generating boric acid and tetrafunctional borate ions that can complex with the polymer through hydrogen bond. Accordingly, borax may be used according to embodiments to complex with gelatin to prepare gel polymer electrolyte for flexible Zn-ion battery 100 due to its improved ionic conductivity and better water retention capability. For example, a gel electrolyte as may be utilized as electrolyte 130 may be prepared by adding 4.0 g gelatin and 0.4 g borax into 40 mL distilled water at 80° C. to dissolve the gelatin under continuous magnetic agitation. Thereafter, $4 \times 10^{-2}$ mol $ZnSO_4$ and $4 \times 10^{-3}$ mol $MnSO_4$ may be added into the solution after all the gelatin has dissolved and stirring continued until a homogeneous solution is formed. The resulting gel electrolyte may be utilized as electrolyte 130 for the assembly of flexible Zn-ion battery 100 of embodiments herein.

It should be appreciated that flexible Zn-ion battery 100 of embodiments herein is configured for restoring shape and energy storage capability against mechanical deformation, such as by temperature triggered shape memory effect. For example, flexible Zn-ion battery 100 may comprise a flexible shape memory yarn battery (SMYB) (i.e., battery configuration comprising one or more spun thread type electrode structure and one or more shape memory structure) or other shape memory configuration. Accordingly, one or more of flexible anode 110 and flexible cathode 120 may comprise a material having shape memory.

Shape memory alloys, such as Nickel-Titanium-based alloys (often referred to as Nitinol), provide shape memory effect (SME) and pseudoelasticity (PE) as a result of the thermoplastic martensitic transformation. Accordingly, due to this SME property, the alloy can restore original shape and recover mechanical deformation with heat triggered martensitic phase transformation and eliminate the strain caused by external force in the alloys. Additionally, the alloy provides electrical conductivity as a metallic material and therefore could be potentially applied as current collector for rechargeable batteries. The PE attribute of such alloys render the material with exceptional elasticity compared with other metallic materials, promising for flexible substrate material for flexible energy storage devices. Accordingly, flexible anode 110 of embodiments of flexible Zn-ion battery 100 may be fabricated using shape memory alloy (e.g., Nitinol) wire as a flexible substrate material having shape memory. Embodiments may additionally or alternatively use polymer materials (e.g., thermoplastic polyurethane), such as may be provided as one or more filaments or fibers.

Figure 1B:
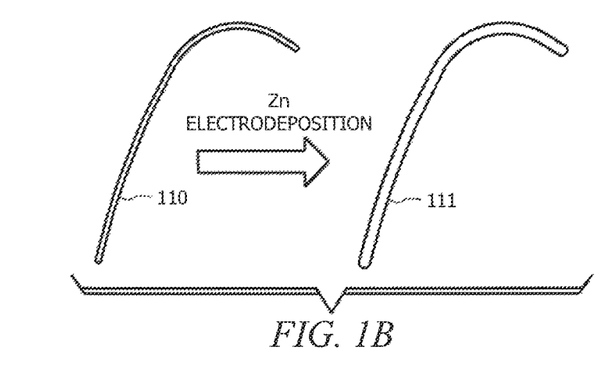
FIG. 1B shows a process for producing a flexible anode of embodiments of the present invention, as may be used in the flexible Zn-ion battery implementation of FIG. 1A.
Figure 1C:
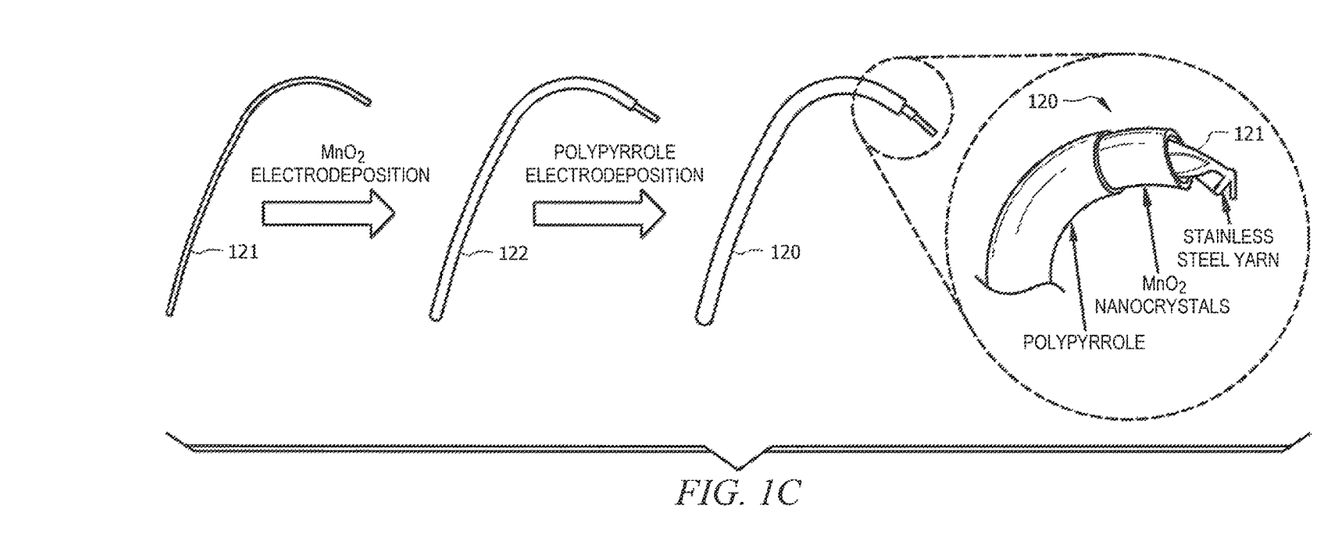
FIG. 1C shows a process for producing a flexible cathode of embodiments of the present invention, as may be used in the flexible Zn-ion battery implementation of FIG. 1A.

Electrodeposition techniques may be used to fabricate the electrode materials comprising flexible anode 110 and/or flexible cathode 120. Electrodeposition techniques a preferred according to embodiments over alternative techniques, such as chemical synthesis techniques, because electrodeposition techniques generally offer improved controllability and structural uniformity compared with chemically synthesized electrode materials. FIGS. 1B and 1C illustrate processes for producing implementations of flexible anode 110 and flexible cathode 120 as may be utilized in embodiments of flexible Zn-ion battery 100.

Referring to FIG. 1B, wherein a process for producing implementations of flexible anode 110 is shown, shape memory substrate 111 (e.g., Nitinol wire) is coated with a zinc material (e.g., zinc, zinc alloy, zinc composites, etc.) to provide a flexible anode electrode having shape memory implementation of flexible anode 110. For example, the material of shape memory substrate 111 may be provided in wire form wherein a length of wire suitable for producing a desired configuration of flexible Zn-ion battery 100 is cut. Shape memory substrate 111 of FIG. 1B is then used as an electrode for electrodeposition of a zinc material (e.g., zinc, zinc alloy, zinc composites, etc.) thereon in a three-electrode mode. As a specific example, Nitinol wire (e.g., Nitinol wire of 0.012, 0.016, 0.020 inch diameter, such as available from Shenzhen Suhang Technology Co., Ltd.) may be cut into an appropriate length and used as a working electrode for zinc electrodeposition in a three-electrode mode. In performing electrodeposition according to embodiments an electrolyte solution containing 0.2 mol $L^{-1}$ $ZnSO_4 \cdot 7H_2O$ and 0.5 mol $L^{-1}$ $Na_3C_6H_5O_7 \cdot 2H_2O$ may be used to electrodeposit Zn onto the Nitinol wire at −1.4 V. In such an electrodeposition process, platinum (Pt) may be used as a counter electrode and silver (Ag) and/or silver chloride (AgCl) may be used as a reference electrode. The amount of zinc anode material deposited on shape memory substrate 111 is adjusted by controlling the deposition time in embodiments of the invention.

It can be observed from analysis of electron microscope characterization of an example of a flexible anode prepared in accordance with the above process that the Zn anode material was successfully deposited on the surface of the NT wire substrate, exhibiting a distinctive morphology compared with original smooth surface of pristine NT wire of 0.02 inch. The same morphologies could also be observed in other NT wires of different diameters. Due to the utilization of sodium citrate, the as-fabricated exemplary Zn anode material comprised vertically oriented nanoplatelets with a thickness of approximately tens to hundreds of nanometer and bonded tightly and compactly to the NT substrate. This favors the mechanical robustness of the Zn coated NT electrode, ensuring the structural integrity of the electrode material during mechanical deformation and subsequent recovery. Moreover, the as-fabricated Zn nanoplatelets of the example analyzed using X-ray diffraction (XRD) spectra could be well-indexed to PDF #87-0713 exhibited high crystallinity, displaying peaks of high intensity and narrow peak width with oxide scarcely existed. This kind of porous nanostructured Zn material facilitates the electrochemical performance of the Zn-ion battery as a result of the high active surface area, beneficial for the penetration of electrolyte and mass transport.

Referring to FIG. 1C, wherein a process for producing implementations of flexible cathode 120 is shown, yarn substrate 121 (e.g., stainless steel yarn, carbon yarn, soft metallic yarns, etc.) is coated with a manganese dioxide ($MnO_2$) material (e.g., $MnO_2$ nanocrystallines, $MnO_2$ nanowires, $MnO_2$ nanorods, $\alpha$-$MnO_2$, $\beta$-$MnO_2$, $\gamma$-$MnO_2$, etc.) to provide a flexible cathode electrode implementation of flexible cathode 120. For example, the material of yarn substrate 121 may be provided in a spool from which a length of yarn suitable for producing a desired configuration of flexible Zn-ion battery 100 is cut. Yarn substrate 121 of FIG. 1C is then used as an electrode for electrodeposition of a manganese dioxide material (e.g., $MnO_2$ nanocrystallines) therein in a three-electrode mode. As a specific example, stainless steel yarn (e.g. 316L stainless steel yarn having a diameter in the range of 180-250 μm, as may be purchased from Kezhengyuan Yarn Company) may be cut into an appropriate length and washed by 1M NaOH at 60° C. to remove surface oxide followed by rinse with distilled water, air dried and used as a working electrode for $MnO_2$ electrodeposition in a three-electrode mode. In performing electrodeposition according to embodiments, $MnO_2$ may be electrodeposited onto the stainless steel yarn substrate in an electrolyte containing 0.1 mol $L^{-1}$ $Mn(Ac)_2$ and 0.1 mol $L^{-1}$ $Na_2SO_4$ using a pulse electrodeposition mode (on-time 1 s at 1.5 V and off-time 10 s at 0.7 V, respectively). In such an electrodeposition process, Pt may be used as a counter electrode and Ag and/or AgCl may be used as a reference electrode. The amount of $MnO_2$ cathode material deposited on yarn substrate 121 is adjusted by controlling the deposition time in embodiments of the invention. After the electrodeposition of $MnO_2$, resulting yarn-based $MnO_2$ electrode 122 may be rinse by distilled water for three times and dried prior to use.

It can be observed from analysis of electron microscope characterization of an example of a yarn-based $MnO_2$ electrode prepared in accordance with the above process that the as-prepared $MnO_2$ materials on the stainless steel yarn substrate exhibited nanocrystallines morphology, with crystal size about 20 nm. The evidence of the nanocrystalline $MnO_2$ could be also be found in analysis of XRD spectra, in which the XRD pattern of as-prepared $MnO_2$ exhibited weak intensities and broadening of primary peaks that could be indexed to $\alpha$-$MnO_2$ (PDF #44-0141). The formation of the $MnO_2$ nanocrystallines was due to the reaction ($Mn^{2+}$+ $2H_2O \rightarrow MnO_2 + 4H^+ 2e^-$) using pulse electrodeposition method in a dilute $Mn^{2+}$ (0.1 mol $L^{-1}$) electrolyte solution, which favors the nucleation while confining the growth of $MnO_2$ nuclei. Additionally, the formation of $MnO_2$ nanocrystallines exposes more surface area, which is favorable for the electrochemical reaction that happens during charge/discharge of the Zn-ion battery.

Embodiments of flexible Zn-ion battery 100 may be configured to provide enhanced cyclic life and/or stability, such as by providing a coating upon yarn-based $MnO_2$ electrode 122 for improved stability of the cathode structure and/or improved energy storage capability of the Zn-ion battery. For example, a thin layer of polypyrrole (PPy) may be used to wrap the electrodeposited $MnO_2$, such as to avoid the aggregation of $MnO_2$ and/or provide mechanical and electrical support to the metal oxide with poor electrical conductivity.

As shown in the exemplary process of FIG. 1C, a PPy coating may be electrodeposited onto yarn-based $MnO_2$ electrode 122. The electrodeposition of PPy coating on the surface of yarn-based $MnO_2$ electrode 122 may be performed in a three-electrode configuration, such as using Ag/AgCl and Pt as reference and counter electrodes respectively, according to embodiments of the invention. In performing electrodeposition of PPy onto yarn-based $MnO_2$ electrode 122 according to embodiments, an electrolyte containing 60 mL aqueous solution of 0.1 mol $L^{-1}$ p-toluenesulfonic acid, 0.3 mol $L^{-1}$, sodium p-toluenesulfonic and 300 μL pyrrole monomer may be used. The electrodeposition may be performed using potentiostatic method at 0.8 V for 10 s in an ice bath. The PPy-coated yarn-based $MnO_2$ electrode material forming flexible cathode 120 of this exemplary embodiment may be rinsed by distilled water and dried prior to use.

It can be observed from analysis of electron microscope characterization of an example of a flexible cathode prepared in accordance with the above that the surface morphology of the pristine stainless steel yarn changed after the deposition of $MnO_2$ nanocrystallines. In addition to the surface of individual fibers of the stainless steel yarn being covered by a thin layer of $MnO_2$ nanocrystallines, the surface morphology of the $MnO_2$ coated yarn may be further changed wherein the surface of individual yarn fibers were wrapped by a layer of polymer after the PPy electrodeposition. The successful coating of PPy on the surface of the $MnO_2$ coated stainless steel yarn may be evidenced by analysis of the Raman spectra, wherein a strong band at approximately 1600 $cm^{-1}$ represents the symmetric stretching of the C=C aromatic ring of PPy, a 1380 $cm^{-1}$ peak represents the asymmetric C—N stretching mode of PPy, while a 1240 $cm^{-1}$ peak are attributed to the C—H in-plane deformation of PPy, respectively. The presence of double peaks at 940 and 990 $cm^{-1}$ are ascribed to the ring deformation related with bipolaron and polarons, respectively. After the electrodeposition of PPy upon an exemplary yarn-based $MnO_2$ electrode, the Raman peaks of $MnO_2$ at approximately 190, 570 and 640 $cm^{-1}$ were still found to be present, representing the M-O stretching mode of the basal plane of the [$MnO_6$] sheet and the symmetric stretching mode of M-O and [$MnO_6$] groups, associated with the major peaks of PPy at 1380 and 1600 $cm^{-1}$ being preserved, indicating successful coating of PPy on the surface of $MnO_2$ coated stainless steel yarn.

Figure 2A:
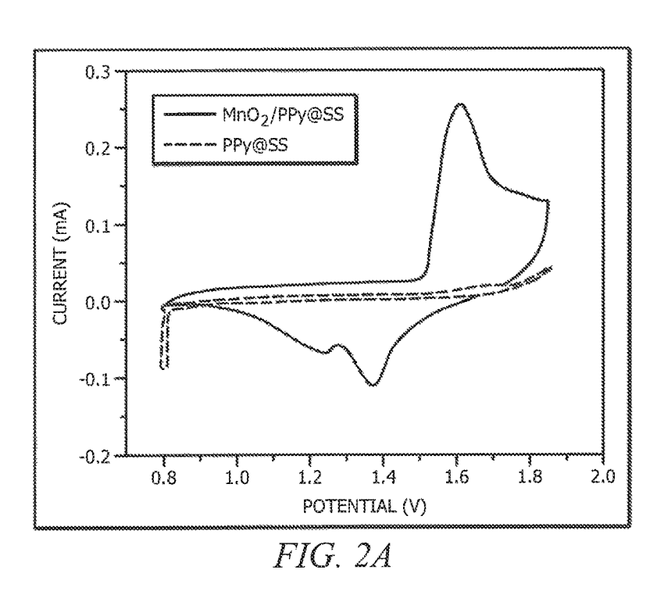
FIGS. 2A-2D show the electrochemical performance of a flexible cathode electrode material prepared in accordance with the process of FIG. 1C.

The electrochemical performance of flexible cathode electrode materials, prepared in accordance with the foregoing, in 1 M $ZnSO_4$ and 0.1 M $MnSO_4$ aqueous electrolyte are shown in FIGS. 2A-2D. Comparison of a PPy-coated yarn-based $MnO_2$ electrode material and PPy coated stainless steel yarn material reveals negligible contribution from the PPy material to the electrochemical performance of the system in a two-electrode configuration when using Zn coated NT material as an anode. For example, FIG. 2A shows cyclic voltammetry (CV) scanning of a Zn coated NT anode and PPy-coated yarn-based $MnO_2$ electrode battery system and a Zn coated NT anode and PPy coated stainless steel yarn electrode battery system at 0.5 mV $s^{-1}$. As can be seen, the Zn coated NT anode and PPy-coated yarn-based $MnO_2$ electrode battery exhibited two pairs of major redox peaks at around 1.62/1.37 V and 1.78/1.24 V, respectively, corresponding to the electrochemical reactions shown below:

$6MnO_2+3Zn+H_2O+ZnSO_4 \leftrightarrow 6MnOOH+ZnSO_4[Zn(OH)_2]_3 \cdot xH_2O$

In comparison, the PPy coating in the Zn coated NT anode and PPy coated stainless steel yarn electrode battery not only did not hinder the electrochemical performance of the $MnO_2$ coated stainless steel electrode material, but also helped reduce the internal resistance of the electrode material so that better electrochemical performance is provided.

Figure 2B:
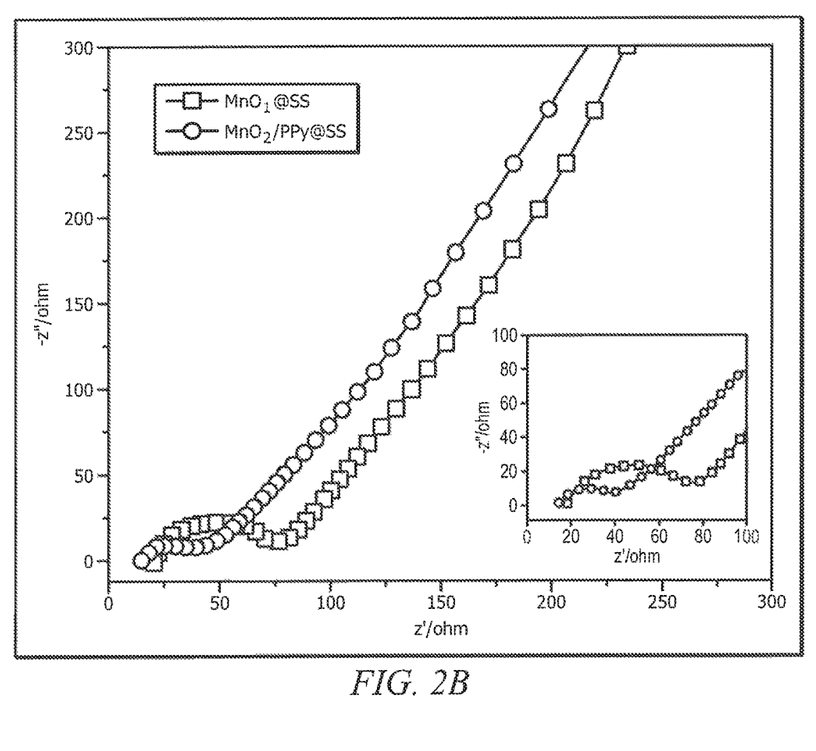

As shown by the electrochemical impedance spectroscopy (EIS) spectra in FIG. 2B, the resistance of the PPy-coated yarn-based $MnO_2$ electrode was much lower compared with yarn-based $MnO_2$ electrode material without PPy coating. This is indicated by a much decreased semicircular loop that represents the reduced charge transfer resistance.

Figure 2C:
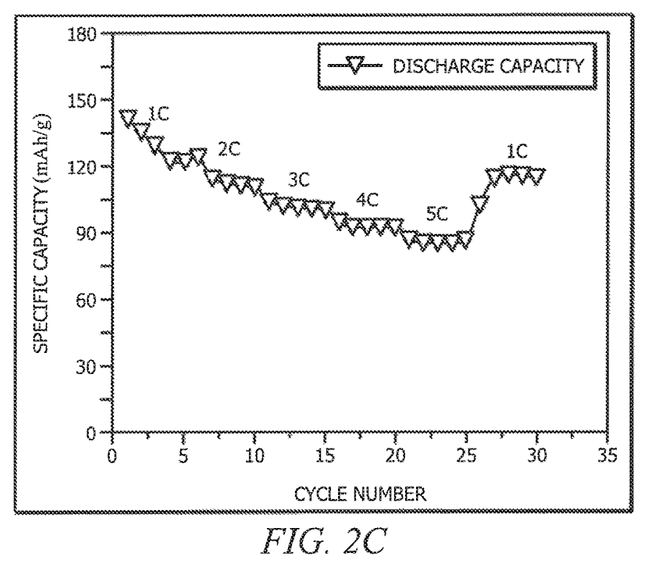

The rate capability of the PPy-coated yarn-based $MnO_2$ electrode material was evaluated by charge/discharge from 1 to 5 C. As shown in FIG. 2C, the electrode material exhibited a maximum discharge capacity of 143.2 mAh $g^{-1}$ at 1 C (average value about 131.5 mAh $g^{-1}$) while maintained 115.9, 102.2, 93.6 and 86.8 mAh $g^{-1}$ at 2, 3, 4 and 5 C current densities in average, corresponding to more than 88.1%, 77.7%, 71.2% and 66% capacity retention, respectively. After cycling back using current density of 1 C, about 113.6 mAh $g^{-1}$ capacity was retained, corresponding to 86.4% retention compared with initial value, demonstrating good rate capabilities.

Figure 2D:
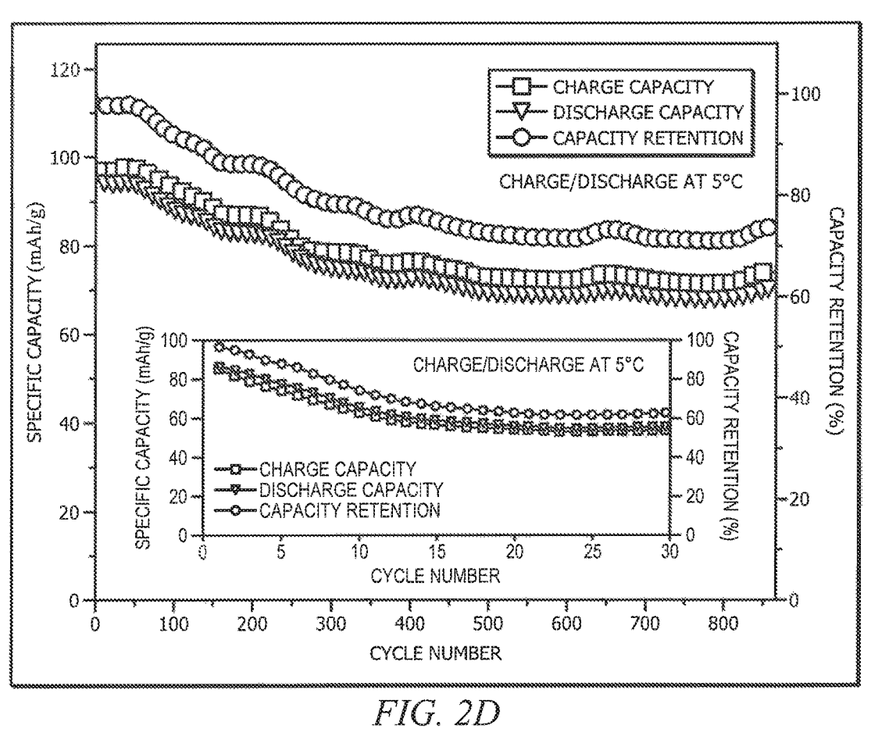

The cyclic stability of the exemplary Zn coated NT anode and PPy-coated yarn-based $MnO_2$ electrode battery system was tested in aqueous electrolyte at 5 C current density. As shown in FIG. 2D, compared with a Zn coated NT anode and yarn-based $MnO_2$ electrode without PPy coating, which exhibited significant capacity loss of more than 35% compared with initial value after only 30 cycles of charge/discharge, the Zn coated NT anode and PPy-coated yarn-based $MnO_2$ electrode battery system displayed excellent cyclic stability of 860 cycles with 74.2% of initial capacity retained. The performance could be attributed to the existence of the PPy-coating, which offers not only the electrical conductivity for the $MnO_2$ nanocrystallines that facilitated the fast charge transfer during charge/discharge but also provides with strong interfacial adhesion to avoid the mechanical detachment of $MnO_2$ from the substrate during cycling.

Flexible anode 110, flexible cathode 120, and electrolyte 130 are preferably combined according to embodiments of the invention to form flexible Zn-ion battery 100. For example, flexible anode 110 comprising shape memory substrate 111 prepared as in FIG. 1B, flexible cathode 120 comprising yarn substrate 121 prepared as in FIG. 1C, and electrolyte 130 comprising a gel electrolyte prepared as described above may be combined to provide a flexible SMYB implementation of flexible Zn-ion battery 100 in accordance with the concepts herein. In combining the foregoing components to form flexible Zn-ion battery 100, flexible anode 110 may be dipped or otherwise immersed into electrolyte 130 to encapsulate the material of flexible anode 110 in electrolyte 130. Similarly, flexible cathode 120 may be dipped or otherwise immersed into electrolyte 130 to encapsulate the material of flexible cathode 120 in electrolyte 130. After the electrolyte coatings have been allowed to solidify, flexible cathode 120, encapsulated in electrolyte 130, may be twined around flexible anode 110, also encapsulated in electrolyte 130, to form a helical structure. Electrolyte 130 may be coated on the resulting helical structure comprising flexible anode 110 and flexible cathode 120 to provide a flexible SMYB implementation after solidification.

Figure 3A:
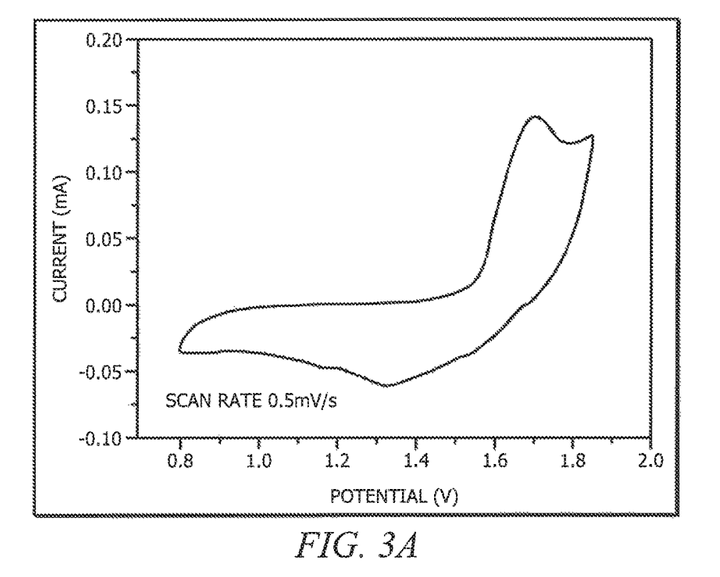
FIGS. 3A-3D show the electrochemical performance of a flexible Zn-ion battery implementation of FIG. 1A comprising a flexible anode prepared in accordance with FIG. 1B, a flexible anode prepared in accordance with FIG. 1C, and a gelatin-borax polymer gel electrolyte.
Figure 3B:
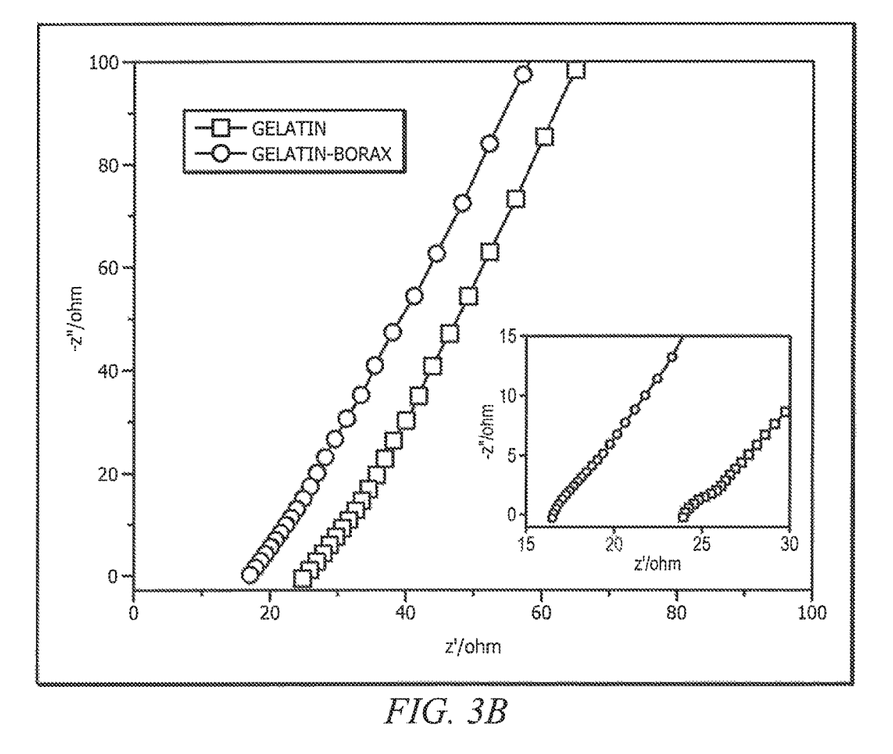
Figure 3C:
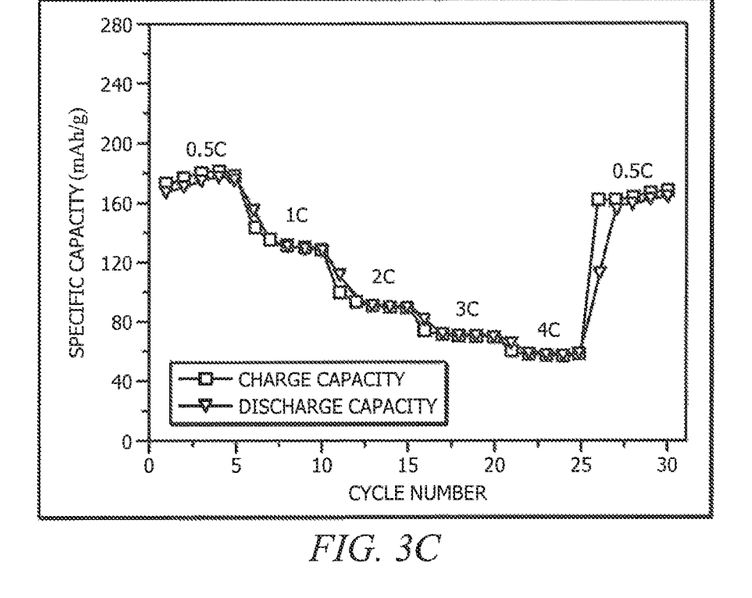
Figure 3D:
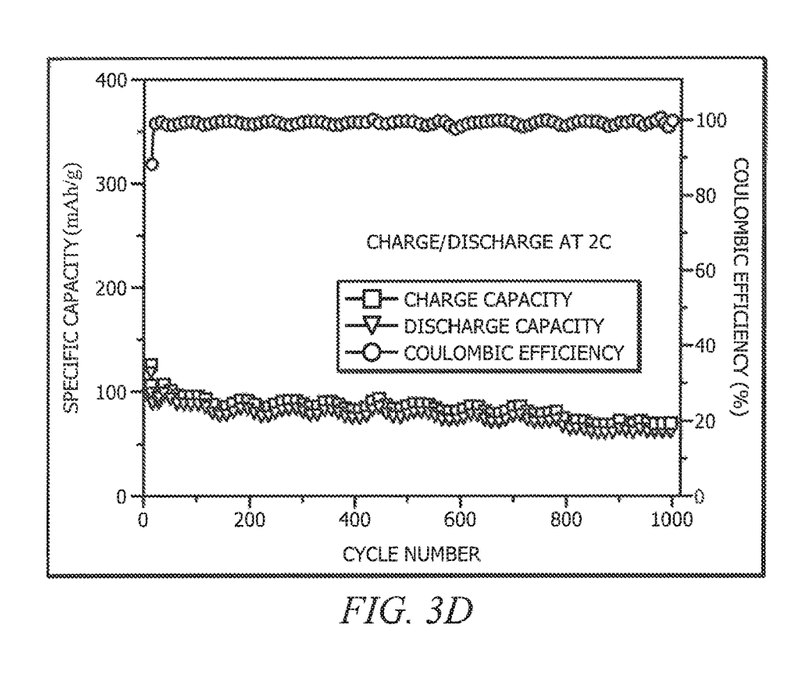
Figure 4A:
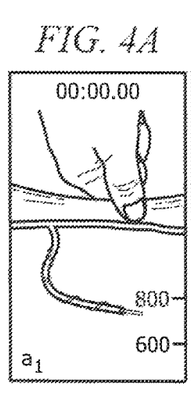
FIGS. 4A-4G show the shape memory property of a flexible Zn-ion battery implementation of embodiments of the invention.
Figure 4B:
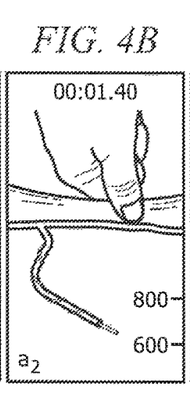
Figure 4C:
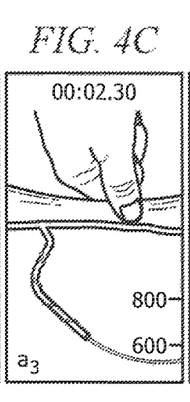
Figure 4D:
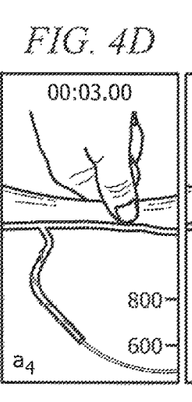
Figure 4E:
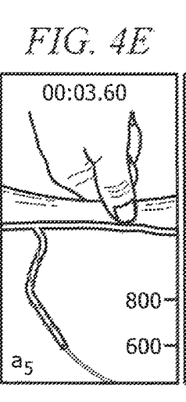
Figure 4F:
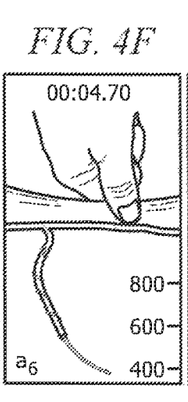
Figure 4G:
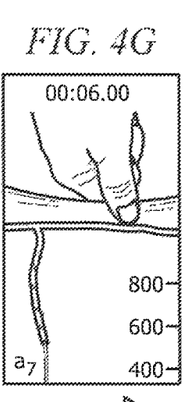

An example flexible SMYB comprising a PPy-coated yarn-based $MnO_2$ electrode cathode, Zn coated NT electrode anode, and gelatin-borax complex electrolyte was implemented in accordance with the foregoing and was found to deliver good electrochemical performance, as outlined below with reference to FIGS. 3A-3D. FIG. 3A shows a CV scan at 0.5 mV s$^{-1}$ in gelatin-borax electrolyte illustrating the electrochemical activity of the battery system. It should be appreciated that, despite the redox peaks being relatively weak compared with in aqueous electrolyte, the major redox pair located at approximately 1.70/1.33 V is well-resolved, although a slight increase in over potential approximately 120 mV was observed compared with aqueous electrolyte, due to the limited ionic conductivity of the gel polymer electrolyte. However, the introduction of borax into the gelatin effectively improved the ionic conductivity of the gelatin-based electrolyte, compared with the electrolyte without the addition of borax, as shown in FIG. 3B. The improved ionic conductivity is likely due to the effect that the addition of borax increased the concentration of free ions, such as tetrafunctional borate ions and improved water retention capability. As a result, the internal resistance of the electrolyte could be further reduced and improved electrochemical performances could be expected. For example, the rate capabilities of flexible SMYB and the cyclic stability of the battery are shown in FIGS. 3C and 3D, respectively. As shown in FIG. 3C, the example flexible SMYB exhibited good rate performances when charged/discharged at current densities from 0.5 to 4 C, delivered an average specific capacity of 174.2 mAh g$^{-1}$ at 0.5 C and retained 136.4, 95.7, 73.1 and 60.0 mAh g$^{-1}$ at 1, 2, 3 and 4 C current densities, respectively. When cycling back using current density of 0.5 C, the battery still maintained 151.7 mAh g$^{-1}$, corresponding to over 87% capacity retention compared with initial value. Furthermore, compared with the electrochemical performances in aqueous electrolyte, the gelatin-borax-based electrolyte delivered comparable electrochemical performances, demonstrating attractive properties as electrolyte material. When cycling at a current density of 2 C, the example flexible SMYB exhibited excellent stability over 1000 cycles of charge/discharge more than 60% of initial capacity retained. Additionally, the Columbic efficiency of the example flexible SMYB kept more than 99% over the 1000 cycles except for the initial several cycles, probably due to the activation of active material. In contrast, the performance of an example flexible SMYB assembled using gelatin-based electrolyte (i.e., without the addition of borax) degraded quickly when cycling at 2 C current density, exhibited cyclic stability of only 200 cycles with less than 31% capacity retention.

Figure 5A:
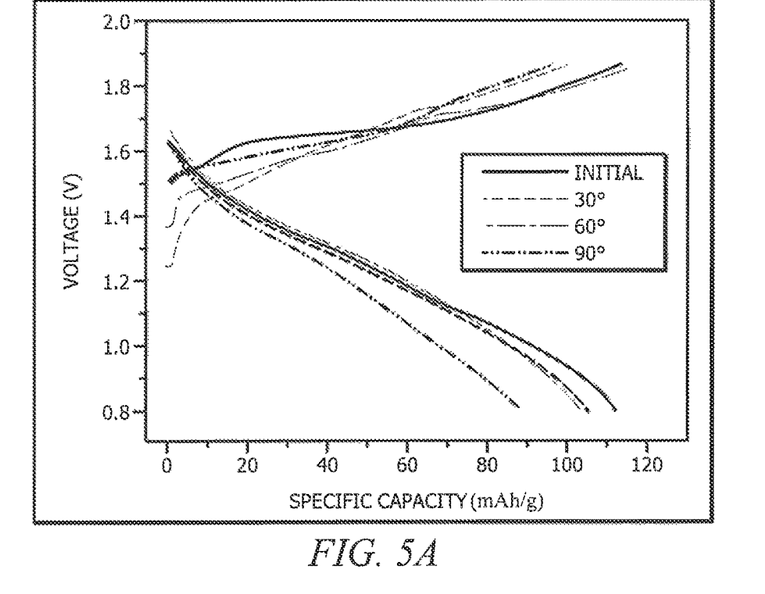
FIGS. 5A-5D show the electrochemical performance of the flexible Zn-ion battery when bended as shown in FIGS. 4A-G.
Figure 5B:
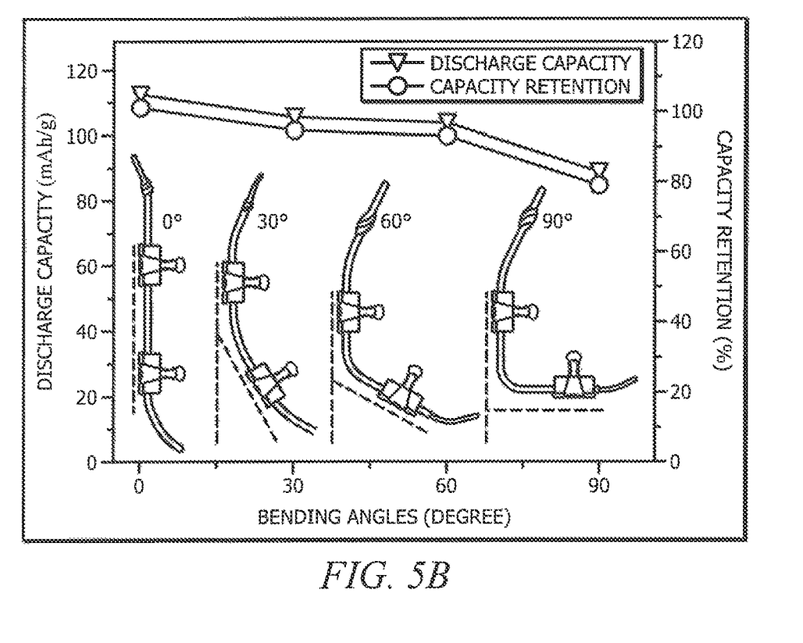
Figure 5C:
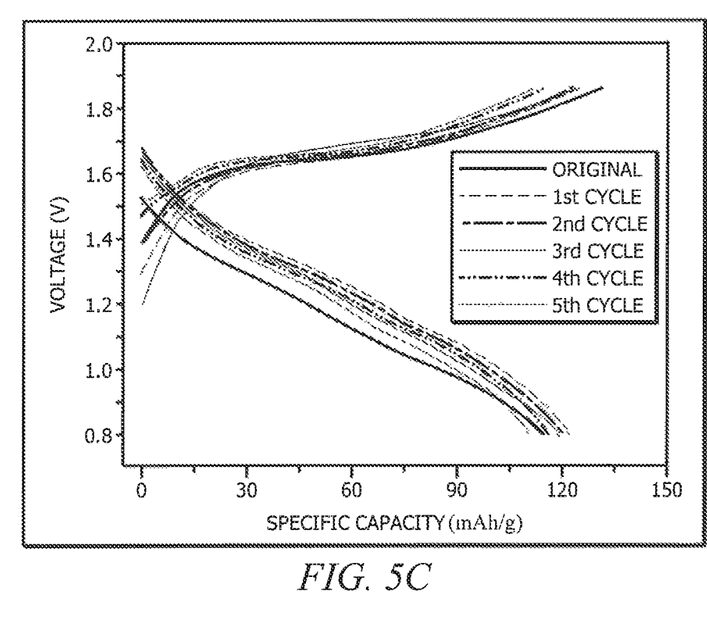
Figure 5D:
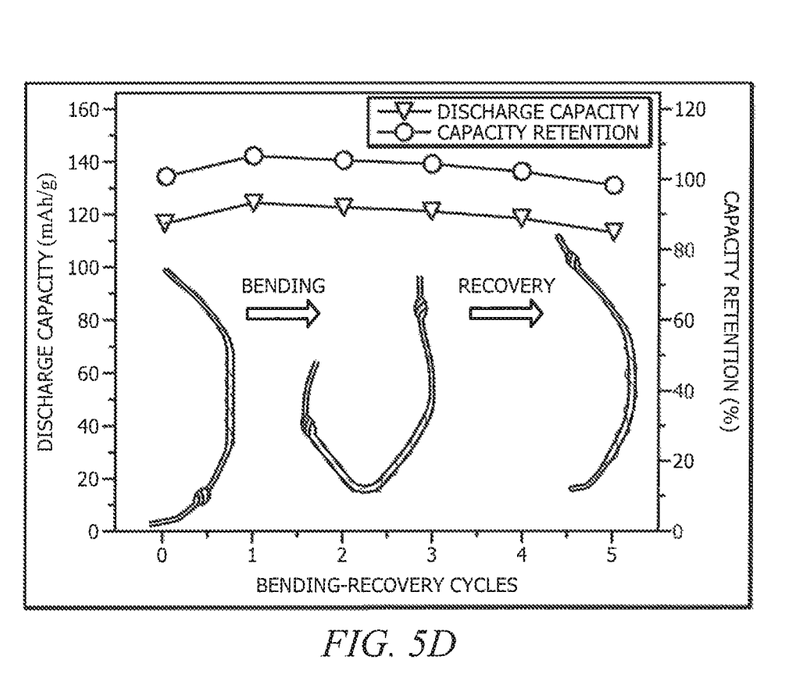

The shape memory property of above described example flexible SMYB comprising a PPy-coated yarn-based MnO$_2$ electrode cathode, Zn coated NT electrode anode, and gelatin-borax complex electrolyte was also evaluated, as shown in FIGS. 4A-4G and FIGS. 5A-5D. The example flexible SMYB was bended manually to nearly 90° and then immersed in 45° C. water, slightly higher than the phase transformation temperature of the Nitinol wire (approximately 35° C.) and the shape memory behavior was recorded accordingly. It can be seen that the example flexible SMYB recovered to its original shape within 6 seconds, exhibiting fast shape recovery characteristics, as shown in FIGS. 4A-4G. Due to the mechanical adhesion from the gelatin-borax electrolyte, the example flexible SMYB displayed good mechanical flexibility and could be bended to different angles, from 0° to 90°, respectively while still preserving the electrochemical performance, as shown in FIGS. 5A and 5B. The charge/discharge characteristic curves of the example flexible SMYB kept almost invariant when bended to 30° and 60° degrees, showing capacity retention about 94.0% and 92.5% when charge/discharge at 2 C, respectively. Further bending of the yarn battery to 90° could still maintain as much as 79% of its initial capacity, demonstrating excellent durability against mechanical deformation. The electrochemical durability of the example flexible SMYB was further tested by continuous bending-recovery and the energy storage capabilities were revealed by charge/discharge at 2 C current density. Every time, the example flexible SMYB was bended and then immersed in 45° C. water to wait for the shape recovery followed by subsequent charge/discharge test. As shown in FIGS. 5C and 5D, the example flexible SMYB exhibited good stability against 5 bending-recovery cycles, displaying nearly invariant charge/discharge curves and excellent capacity retention. Even at the 5$^{th}$ cycle of bending-recovery, the example flexible SMYB exhibited 96.8% retention of initial capacity. This demonstrates that flexible batteries of embodiments of the invention can not only recover the mechanical deformation caused by external force but also obtain the durability to recover most of the electrochemical performance, which was promising for highly durable and multifunctional energy storage devices.

As can be appreciated from the foregoing, the concepts described herein provide for the fabrication of smart yarn-based flexible and rechargeable Zn-ion batteries of embodiments herein having shape memory function. Accordingly, embodiments of flexible Zn-ion batteries are configured to restore the shape and energy storage capability against mechanical deformation by temperature triggered shape memory effect. Embodiments of flexible Zn-ion batteries with shape memory are particularly well suited for use with respect to flexible and wearable electronics.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A zinc-ion battery comprising:
   a flexible anode formed from a shape memory material coated with a zinc material;
   a flexible cathode formed from a conductive material coated with a manganese dioxide (MnO$_2$) material; and
   an aqueous electrolyte.

2. The zinc-ion battery of claim 1, wherein the shape memory material of the flexible anode comprises:
   a Nickel-Titanium-based alloy providing shape memory effect (SME) and pseudoelasticity (PE).

3. The zinc-ion battery of claim 2, wherein the zinc material comprises a material selected from the group consisting of:
   zinc;
   a zinc alloy; and
   a zinc composite.

4. The zinc-ion battery of claim 3, wherein the zinc material is disposed in a layer upon a surface of the Nickel-Titanium-based alloy by electrodeposition.

5. The zinc-ion battery of claim 1, wherein the conductive material of the flexible cathode comprises:
a stainless steel yarn.

6. The zinc-ion battery of claim 5, wherein the $MnO_2$ material comprises:
$MnO_2$ nanocrystallines.

7. The zinc-ion battery of claim 6, wherein the $MnO_2$ material is disposed in a layer upon a surface of the stainless steel yarn by electrodeposition.

8. The zinc-ion battery of claim 1, wherein the $MnO_2$ material of the flexible cathode is coated with a polypyrrole (PPy) coating.

9. The zinc-ion battery of claim 1, wherein the aqueous electrolyte comprises:
a 1 M $ZnSO_4$ and 0.1 M $MnSO_4$ aqueous electrolyte.

10. The zinc-ion battery of claim 1, wherein the aqueous electrolyte comprises:
a polymer gel electrolyte.

11. The zinc-ion battery of claim 10, wherein the polymer gel electrolyte comprises:
a gelatin-borax polymer gel electrolyte.

12. The zinc-ion battery of claim 1, wherein the zinc-ion battery is flexible and rechargeable.

13. A method for providing a flexible zinc-ion battery, the method comprising:
coating a shape memory material with a zinc material to form a flexible anode electrode of the flexible zinc-ion battery;
coating a conductive material with a manganese dioxide ($MnO_2$) material to form a flexible cathode electrode of the flexible zinc-ion battery; and
disposing an aqueous electrolyte between the flexible anode electrode and the flexible cathode electrode to form the flexible zinc-ion battery.

14. The method of claim 13, wherein the shape memory material of the flexible anode electrode comprises a Nickel-Titanium-based alloy providing shape memory effect (SME) and pseudoelasticity (PE).

15. The method of claim 13, wherein the zinc material comprises a material selected from the group consisting of zinc, a zinc alloy, and a zinc composite.

16. The method of claim 13, wherein coating the shape memory material with the zinc material comprises:
using an electrodeposition process to dispose the zinc material in a layer upon a surface of the shape memory material.

17. The method of claim 13, wherein the conductive material of the flexible cathode electrode comprises a stainless steel yarn.

18. The method of claim 13, wherein the $MnO_2$ material comprises $MnO_2$ nanocrystal lines.

19. The method of claim 13, wherein coating the conductive material with the $MnO_2$ material comprises:
using an electrodeposition process to dispose the $MnO_2$ material in a layer upon a surface of the conductive material.

20. The method of claim 13, further comprising:
coating the $MnO_2$ material coating the flexible cathode electrode with a polypyrrole (PPy) coating.

21. The method of claim 13, wherein the disposing the aqueous electrolyte between the flexible anode electrode and the flexible cathode electrode comprises:
encapsulating at least one of the flexible anode electrode or the flexible cathode electrode with the aqueous electrolyte.

22. The method of claim 13, further comprising:
adding $ZnSO_4$ and $MnSO_4$ to a gelatin-borax polymer gel to form the aqueous electrolyte.

23. A flexible and rechargeable zinc-ion battery comprising:
a flexible anode formed from a Nickel-Titanium-based alloy coated with a zinc material, wherein the Nickel-Titanium-based alloy provides shape memory to the flexible and rechargeable zinc-ion battery;
a flexible cathode formed from a stainless steel yarn coated with a manganese dioxide ($MnO_2$) material; and
an aqueous electrolyte.

24. The flexible and rechargeable zinc-ion battery of claim 23, wherein the zinc material is disposed in a layer upon a surface of the Nickel-Titanium-based alloy by electrodeposition.

25. The flexible and rechargeable zinc-ion battery of claim 23, wherein the $MnO_2$ material is disposed in a layer upon a surface of the stainless steel yarn by electrodeposition.

26. The flexible and rechargeable zinc-ion battery of claim 23, wherein the $MnO_2$ material of the flexible cathode is coated with a polypyrrole (PPy) coating.

27. The flexible and rechargeable zinc-ion battery of claim 23, wherein the aqueous electrolyte comprises:
a gelatin-borax polymer gel electrolyte having $ZnSO_4$ and $MnSO_4$ added thereto.

* * * * *

UNITED STATES PATENT AND TRADEMARK OFFICE
CERTIFICATE OF CORRECTION

PATENT NO. : 10,446,840 B2
APPLICATION NO. : 15/805817
DATED : October 15, 2019
INVENTOR(S) : Zifeng Wang et al.

It is certified that error appears in the above-identified patent and that said Letters Patent is hereby corrected as shown below:

In the Specification

At Column 2, Line number 35, delete "nanocrystallines))" and replace with --nanocrystallines)--.
At Column 4, Line number 34, delete "by adding 4.0 g gelatin" and replace with --by adding 4.0 g of gelatin--.
At Column 4, Line number 57, delete "thermoplastic" and replace with --thermoelastic--.

In the Claims

At Column 12, Claim number 18, Line number 5, delete "nanocrystal lines" and replace with --nanocrystallines--.

Signed and Sealed this
Fourteenth Day of January, 2020

Andrei Iancu
*Director of the United States Patent and Trademark Office*